United States Patent

Malkamaki et al.

[11] Patent Number: 5,483,668
[45] Date of Patent: Jan. 9, 1996

[54] METHOD AND APPARATUS PROVIDING HANDOFF OF A MOBILE STATION BETWEEN BASE STATIONS USING PARALLEL COMMUNICATION LINKS ESTABLISHED WITH DIFFERENT TIME SLOTS

[75] Inventors: Esa Malkamaki, Espoo; Harri Jokinen, Hiisi, both of Finland

[73] Assignee: Nokia Mobile Phones Ltd., Salo, Finland

[21] Appl. No.: 80,934

[22] Filed: Jun. 22, 1993

[30] Foreign Application Priority Data

Jun. 24, 1992 [FI] Finland ............................ 922938

[51] Int. Cl.⁶ .............................. H04B 7/26; H04Q 7/22
[52] U.S. Cl. .................... 455/33.2; 455/33.4; 455/34.1; 455/54.1; 455/56.1; 370/95.3; 379/60
[58] Field of Search ................................ 455/33.1, 33.2, 455/33.4, 34.1, 54.1, 54.2, 56.1, 67.1; 379/59, 60; 370/95.1, 95.3

[56] References Cited

U.S. PATENT DOCUMENTS 5,095,531  3/1992  Ito ............................................ 455/33.2
5,101,501  3/1992  Gilhousen et al. ...................... 455/33
5,323,446  6/1994  Kojima et al. ..................... 455/54.1 X
5,345,448  9/1994  Keskitalo .............................. 370/95.3

FOREIGN PATENT DOCUMENTS

0281111A2  9/1988  European Pat. Off. .
0324508    7/1989  European Pat. Off. .
0430106A2  6/1991  European Pat. Off. .
0509548A2  10/1992 European Pat. Off. .
922938     2/1993  Finland .

*Primary Examiner*—Chi H. Pham
*Attorney, Agent, or Firm*—Perman & Green

[57] ABSTRACT

The soft handover of a channel or a base station according to the invention functions especially well in a TDMA system with a high TDMA milo. For the time of preparation of handover parallel physical links are formed between the mobile station (MS) and two or more base stations (BTS1, BTS2), whereby these base stations transmit the same signal to the mobile station (MS) in different time slots, and possibly in a different frequency.

21 Claims, 5 Drawing Sheets

METHOD AND APPARATUS PROVIDING HANDOFF OF A MOBILE STATION BETWEEN BASE STATIONS USING PARALLEL COMMUNICATION LINKS ESTABLISHED WITH DIFFERENT TIME SLOTS

FIELD OF THE INVENTION

The present invention relates to handover in a cellular radio system.

BACKGROUND TO THE INVENTION

The switching of the base station is illustrated in FIG. 1 which shows the main components of a cellular network constructed in a way known per se. The system includes at least one center MSC (Mobile Services Switching Center) which is connected to a public telephone network NET, for instance. The center communicates with controllers BSC 1–3 (Base Station Controller) of the base station which controllers may comprise one or more base stations BTS (Base Transceiver Station). In addition, several mobile stations (MS) travel in the network in the zones (not shown) of the cells of the base stations BTS. For the sake of clarity only one mobile station, a mobile telephone in this instance, is illustrated. Intercommunications within the network can be established between mobile stations MS and/or between mobile station MS and network NET.

When travelling in the area of the network, mobile station MS can reach the border of the cell, i.e., coverage area of its current base station BTS, and a link has to be established with another base station BTS which is closer so that the mobile station can move from one cell of the network to another without an interruption occurring in the intercommunication in progress. In practice this means that when the base station is switched, the channel used between the mobile station and the base station is switched. In the TDMA system the channel means the time slot in which the procedures are carried out. (Switching the channel may also be required when moving within one cell.) The term "handover" is also used when speaking of channel switching and in FIG. 1 it is illustrated in curves a (switch 1)→2)) and b (switch 2)→3)).

In order to ensure an interference-free handover the mobile station monitors at regular intervals the quality of reception, for instance, the strength of the signal of its own base station and that of the next nearest base stations and sends the results to the base station BTS it uses at that moment, from where the data is directed to controller BSC and if so required, to center MSC. On the basis of the monitoring results the center, and in the future perhaps the mobile station as well, can specify a new base station for the mobile station and the exact moment for the handover, when, for example, the communication with the old base station has diminished.

FIG. 2 illustrates a situation where the mobile station MS is transferred from cell 1 of base station BTS1 to cell 2 of another base station BTS2. The transfer is illustrated in arrow A. Mobile station MS first communicates, on radio link R1, with base station BTS1, which monitors the power of the signal of MS during the communication and reports on it to center MSC, when a handover to base station BTS2 under base station controller BSC2 is expected to occur. Mobile station MS monitors once in a while (dining the monitoring cycle), based on the neighbouring base station list it has received, the signal of its neighbouring base stations as well, in this case the signal of base station BTS2, and reports on it to BTS1. When the handover criterion is met, a message is signalled to base station controller BSC2 including the parameters required in recognizing mobile station MS and the data of the new channel (time slot) which will be used in communication between mobile station MS and base station BTS2. After preparation the handover to the new base station is performed, controlled by MSC. The signalling required in this operation is illustrated in mows S1 to S3.

A perfect handover should occur without the user noticing any interferences. For this purpose, different methods for handover have been developed and researched in different cellular systems.

A soft handover is considered an advantage offered by the CDMA system. In the CDMA system (Code Division Multiple Access), several base stations are capable of receiving a signal transmitted by a mobile station by using the same code. Similarly, several base stations may send the same signal to a mobile station using the same code, and the moving station receives the signals like signals coming through multipath propagation. The CDMA system is being developed for a digital mobile station network in the U.S.A., for instance. Another significant mobile station network system is based on the TDMA (Time Division Multiple Access) which is used or will be used, for instance, in the GSM system (Global System for Mobile Communication), the DECT system (Digital European Cordless Telephone) for cordless telephones, and the digital (ANSI) mobile station system in the U.S.A.

The soft handover described above with respect to the CDMA system could also be implemented in the TDMA system. Thus two or more base stations can receive a signal transmitted by a mobile station simultaneously. This is often referred to as macrodiversity. However, this requires that the base stations are either synchronized to each other (because otherwise the base stations cannot receive at the same time but the transmission bursts overlap in the other base station) or that the other base station uses a separate carrier and a receiver for reception. This type of arrangements make the network more complicated and its use more difficult.

In the above-mentioned cases, problems can also occur in the TDMA network regarding the exact adjustment of the time alignment of the mobile station because mobile station MS adjusts its transmission in accordance with one base station, but the same time alignment does not necessarily suit the other base station. On the other hand, the extended guard time between bursts could be used but this would lead to an unnecessarily large requirement for capacity.

In the TDMA system, it is possible to arrange so that two or more base stations send the same signal to the mobile station "simultaneously" by using the same time slot and carrier wave frequency. Such an operation is called "simulcasting" (sometimes also macrodiversity). This type of transfer would also require synchronization of the base stations. If the mobile station receives a signal from two base stations simultaneously (and the signals cannot be distinguished from each other within the resolution of the receiver) and if the signals are approximately equally strong, this will create a strong standing wave pattern in which the signals either strengthen or cancel each other, whereby the mobile station experiences this as strong fading. This type of fading can have a greater effect than fading due to multipath propagation. This problem could be solved by using a suitable delay between the base stations, whereby signals would arrive at the mobile station at different points in lime and would not cancel each other but they could be utilized by a Viterbi type of receiver, for instance. However, adjusting the delay would be difficult, at least when the mobile station MS is moving. In addition, adjusting the delay would substantially increase the signalling between the base station and the mobile station. Besides, the adjustment of the delay must stay within a limited range because if the delay between the signals increases too much, the receiver is not able to use both signals. Simulcasting also adds to the interference level of the whole network because a particular frequency is used in adjacent base stations.

SUMMARY OF THE INVENTION

According to the present invention there is provided apparatus for performing handover in a cellular radio system comprising a first cell and a second cell disposed adjacent said first cell, wherein two different communication channels are utilised during handover between said first cell and said second cell. This has the advantage in that it provides a simple solution for implementing reliable handover.

In a preferred embodiment of the invention them is further provided a first base station (BTS1) and a second base station (BTS2) for respective first and second cells and at least one mobile station (MS), and wherein there is provided means for communicating between the second base station (BTS2) said at least one mobile station (MS) via a second base station (BTS2) communication channel which is different to a communication channel utilized by the first base station (BTS1) for communicating with said at left one mobile station (MS) during handover between the first base station (BTS1) and the second base station (BST2). Due to the fact that the mobile station (MS) communicates with two or more base stations (BST) during handover, there is a low likelihood that an interruption in communication will occur when the mobile station goes from one cell to another cell. Preferably, the cellular radio telephone system further comprises at least one mobile switching centre (MSC), and the selecting means is disposed at the at least one mobile switching centre (MSC) or first or second base station (BTS1, BTS2). This has the advantage that the circuitry necessary for implementing the selecting means is not included in the mobile station (MS). Thus, the mobile station (MS) can have a lower size and weight.

In another aspect of the invention there is provided a method for performing handover in a cellular radio telephone system comprising a first base station (BTS1) and a second base station (BTS2) and at least one mobile station (MS), wherein during handover of said at least one mobile station (MS) between the first base station (BTS1) and the second base station (BTS2), the second base station (BTS2) is able to communicate with said at least one mobile station (MS) by utilizing a different communication channel to the communication channel utilized by the first base station (BTS1) for communicating with said at least one mobile station (MS).

DESCRIPTION OF SPECIFIC EMBODIMENTS OF THE INVENTION

Figure 1:
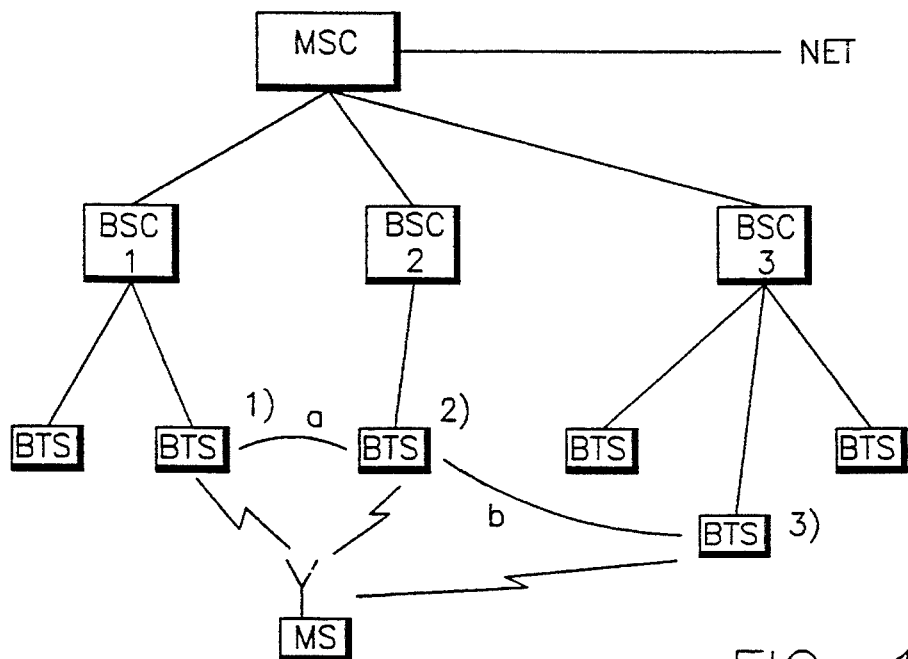
FIG. 1 represents the common structure of a mobile station network known per se.
Figure 2:
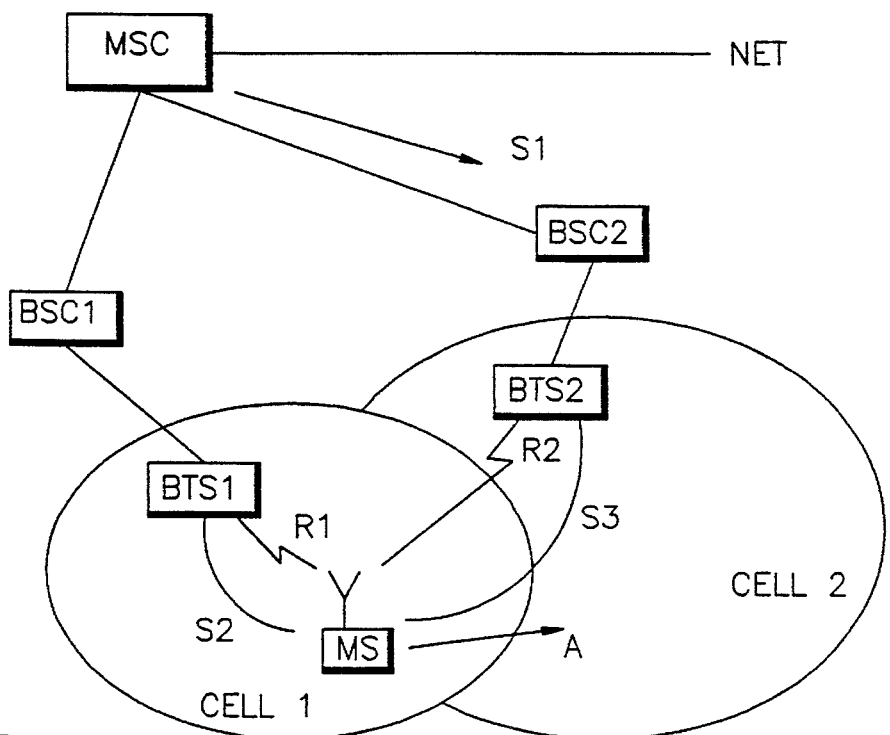
FIG. 2 illustrates a situation where the mobile station moves from the cell of the base station to the cell of another base station.
Figures 3, 7:
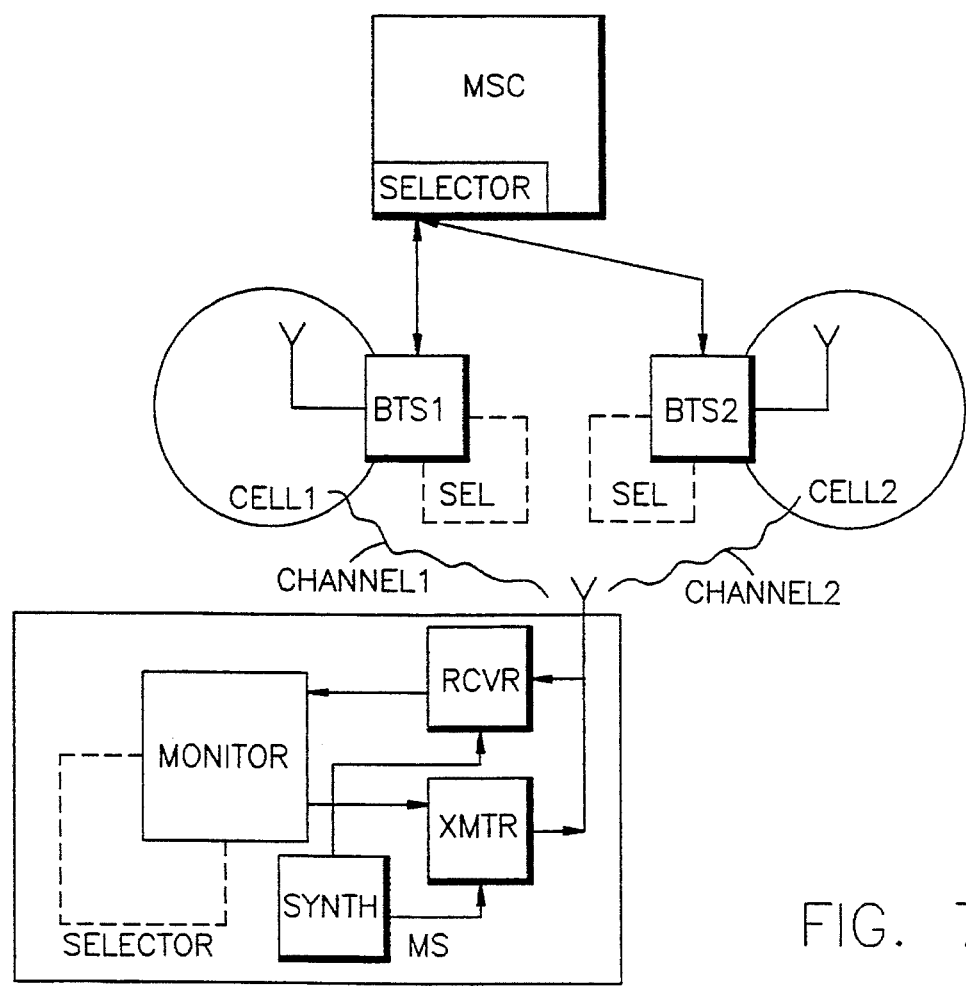
FIG. 3 represents a GSM type of use of time slots, known per se.
FIG. 7 is a simplified block diagram of a cellular communications system in accordance with the invention.

Before considering the method according to the invention more closely, we will first examine a known use of time slots in a GSM type of telecommunication with the aid of FIG. 3. For the sake of clarity, only one time axis is used in the Figure for both mobile station MS and base station BS. The time axis goes from top to bottom and this is illustrated using increasing numbers in the slots. In this case frame Fr comprises eight time slots 0 ... 7, in other words, the GSM system uses a frame of 8 time slots or channels. The figure shows two sequential frames FrN and FrN+1. In the example the mobile station transmits in time slot 4 and the base station transmits in time slot 1. Marking "Mon" refers to the monitoring cycle of the mobile station which we already referred to in the common part when describing FIGS. 1 and 2. During the Mon cycle the MS monitors the signal of the neighbouring base stations. The monitoring does not have to coincide accurately within the time slot limits; in the Figure, Mon is shown in time slot 6 but it could just as well be situated somewhere between time slots 6 and 7, for instance.

Figure 5:
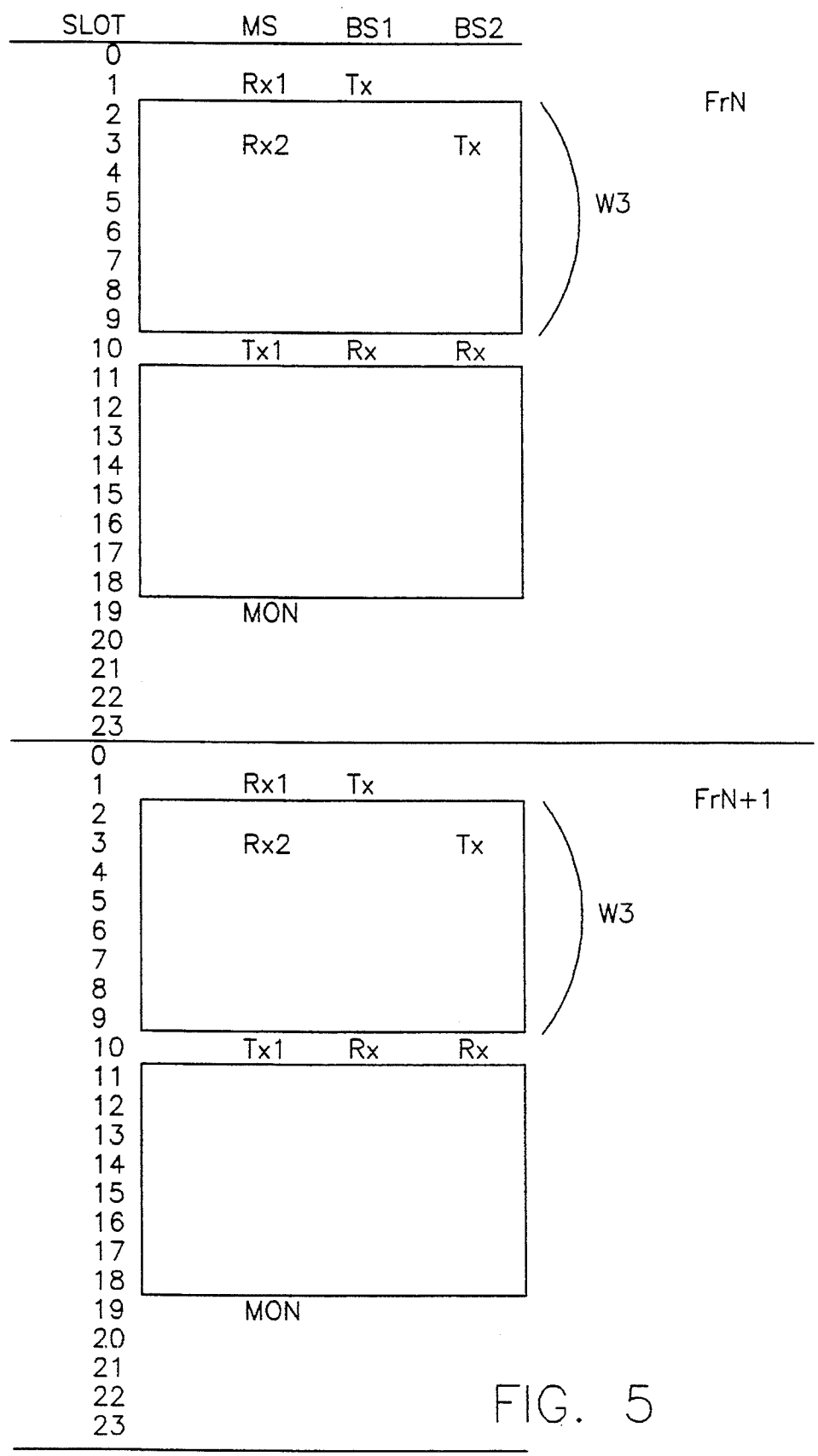
FIG. 5 represents the use of lime slots in a TDMA system by the method according to the invention, according to another alternative.
Figure 6:
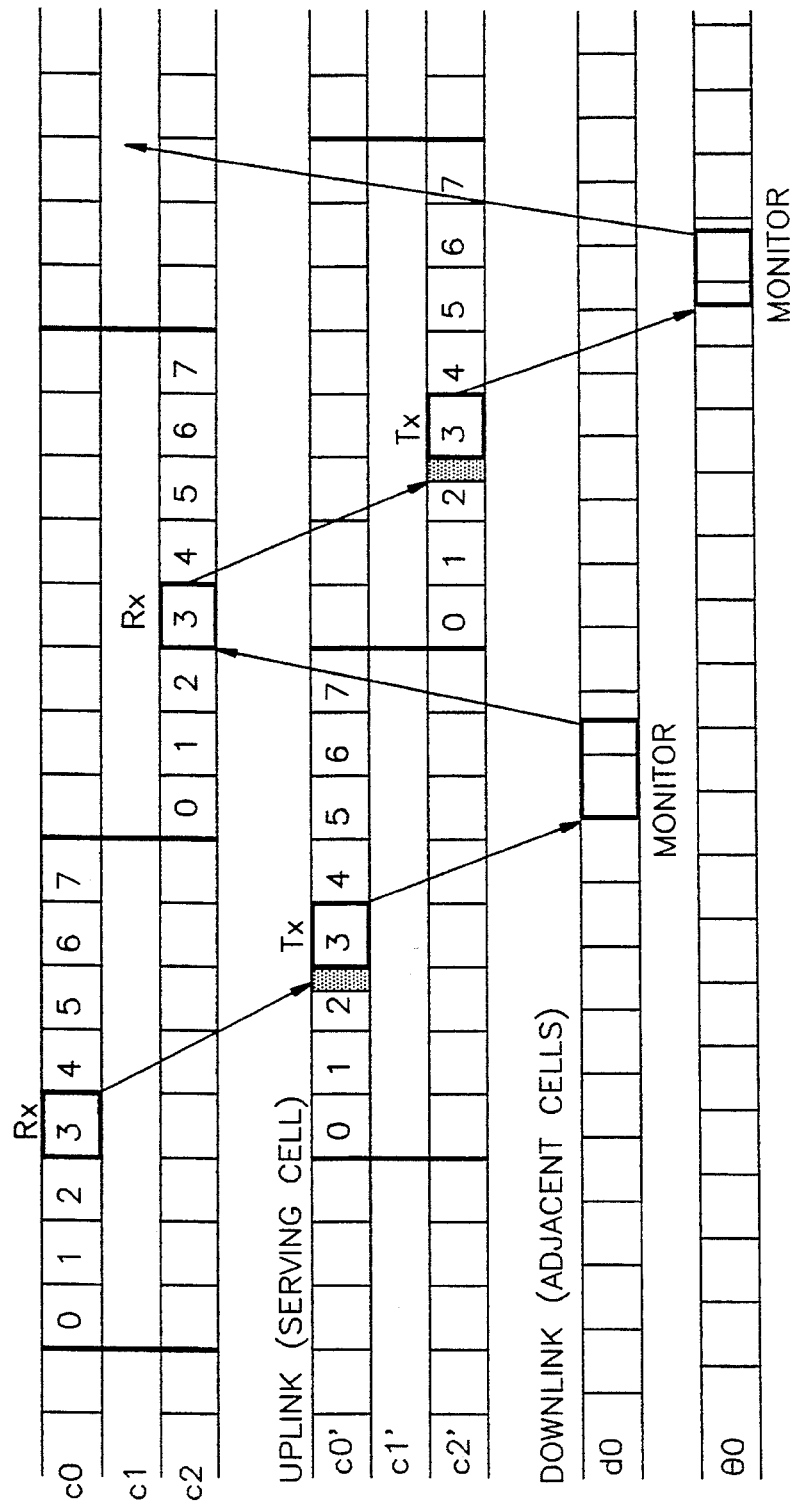
FIG. 6 illustrates the principle and tinting of the use of time slots in different communication directions.

FIG. 6 represents the ETSI/GSM proposal for the order of the time slots and an example has been added to it where mobile station MS receives in time slot 3/Rx (Downlink) from its "own" base station (serving cell). Then the MS transmits (Uplink) in another time slot 3/Tx. Somewhere in between the MS monitors the signals of neighbouring base stations (adjacent cells). This Figure shows more clearly how different the timing of the base station and the mobile station can be in practice, even though only one time axis is used in FIGS. 3, 4, and 5 for the sake of clarity.

Figure 4:
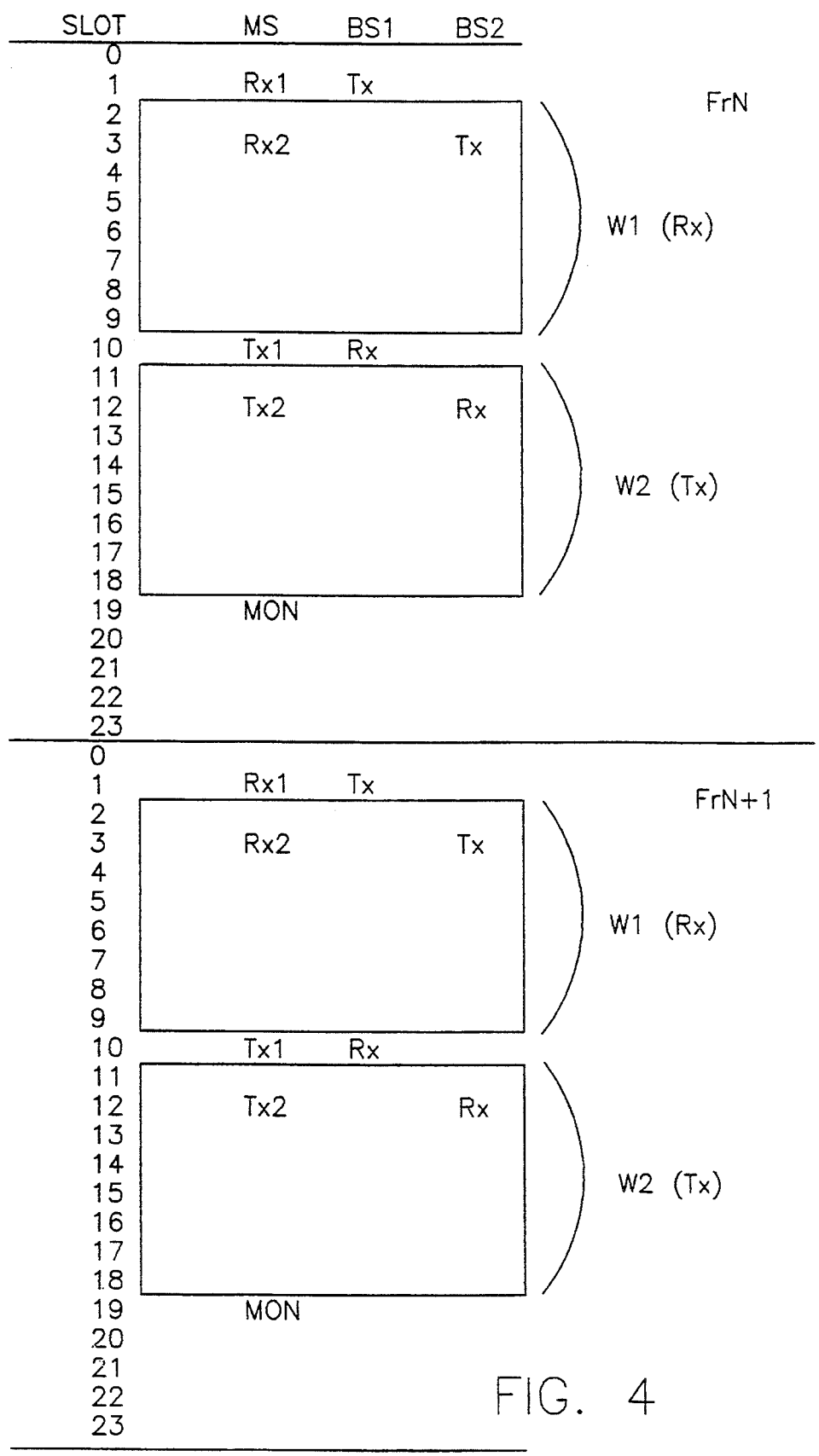
FIG. 4 represents the use of time slots in a TDMA system using the method according to the invention.

The method according to the invention is advantageously applied in a case where the so-called TDMA ratio is high; the examples of FIGS. 4 and 5 use 24 time slots per frame.

In the example of FIG. 4 the MS uses two perfect physical links during the switching of base stations, i.e., the soft handover, according to the invention. Thus mobile station MS receives in time slot 1 from its own base station BS1 and transmits in time slot 10 to its own base station. The time slot number of the other base station BS2 is selected for the mobile station within the available window W1/W2, whereby reception window W1(Rx) and transmission window W2(Tx) are situated symmetrically in frame FrN. FIG. 4 shows only two sequential frames FrN and FrN+1. The window (W1/W2) in which the MS is able to communicate with the other base station BS2 depends on the speed of the frequency synthesizer (SYNTH, as shown in FIG. 7) of the MS. In the example of FIG. 4, the MS uses two perfect physical links, whereby the absolute timing of the other base station is not significant. In this situation, the cells of both base stations BS1, BS2 use frequencies within the normal frequency planning or those within the dynamic channel allocation. Enough capacity for one channel only is reserved from the other base station BS2 for the preparation and execution of the handover.

FIG. 5 represents another alternative of the method according to the invention.

This requires that the alternative second base station BS2 uses a separate receiver which possibly deviates from its own synchronization, or alternatively, that base stations BS1 and BS2 are synchronized with each other, whereby base station BS uses a fast synthesizer for changing the frequency. Thus the second transmission of the mobile station MS can be removed, i.e., MS only transmits once and both base stations receive the same time slot as presented in time slot 10. Thus the other base station BS2 "listens" to the same transmission as the user's "own" base station BS1. However, MS receives separately from both base stations, as depicted by time slots 1 and 2. Window W3 in which the MS is able to communicate with the other base station BS2, depends on the speed of the synthesizer of the MS.

In the case of FIG. 5 the transmission of the second base station BS2 can be in the frequency band normally reserved for the cell, which is preferred in the frequency planning, but in this case it reserves capacity from the normal communication of the cell of BS2.

In FIGS. 4 and 5 the transmission and reception of the TDMA structure is separated into separate periods, but the principle according to the invention functions also if the transmission/reception of the user's own base station BS1 is placed into a group within the switching time of the synthesizer. However, the alternatives according to FIGS. 4 and 5 are more advantageous in, for instance, the practical implementation of the signal processing of the receiver and the transmitter.

It can be seen from the above that, according to the invention, a phase is added to the "hard" handover of the base station known per se, in which phase the mobile station MS communicates simultaneously with two (or more) neighbouring base stations. In the embodiment described the soft handover method according to the invention for enhancing the switching of the base station comprises phases in which mobile station MS a) periodically monitors (Mon) the signal sent by the nearest base stations (BTS1, BTS2), b) sends its respective monitoring results to the base station (BTS) and/or the center (MSC), whereby c) the base station or the center, on the basis of the monitoring result it has received and predetermined criteria, further directs the mobile station (MS) to form parallel links to two or more base stations for preparing the handover, whereby the switching of the base station is implemented by disconnecting one channel (R1 in FIG. 2) or all other channels but the selected new channel (R2). In the case of several base stations, forming and disconnecting the physical links does not necessarily have to be performed at the same time. The parallel physical links to two (or more) base stations formed according to the invention remain coupled for about 0, 5 . . . 10 seconds, in practice about 1 or 2 seconds, depending on the properties of the system and the cell structure. The parallel linking time is preferably adjustable if so required. In the usual way the level of the signal, the level of interferences, etc., is used as the criterion for switching the base station. The link to the previous base station (for instance BS1 or BTS1) is switched off when the MS has moved under the effect of the other base station (BS2 or BTS2) and into its cell. In the above, the base station or the center controls the switching of channels; alternatively also the mobile station can direct the handover in question.

Thus, according to the invention a soft handover of the base station or channel is performed, whereas according to the known technique a hard handover of the base station is performed in which the MS respectively communicates with only one base station at a time.

In the handover according to the invention two or more base stations in a TDMA system transmit the same signal to the mobile station in a different time slot and possibly on a different frequency. Thus, at least the data of the user is the same, even though the signalling data (S2, S3 in FIG. 2) for different base stations can be different. In the example of FIG. 4, MS transmits in a different time as well, i.e., in a different time Mot to different base stations. Also in this case at least the user's data is the same while the signalling data for different base stations can be different. In the example in FIG. 4 the base stations need not be synchronized; pseudo-synchronization is sufficient, whereby MS always knows the relative time difference between base stations (see FIG. 6, for instance) and it can accommodate its own transmission and reception separately for each base station. The fading phenomenon due to standing wave pattern is not created because signals from different base stations do not arrive in the mobile station at the same time, consequently, no adjustment of the transmission delays of the base stations is required. MS simply counts the necessary transmission and reception moments. When using the method according to the invention, no extended guard times between bursts are needed either.

The solution according to the invention for handover does increase the need for signal processing in the mobile station since it has to receive two bursts. The need for signal processing can be decreased if, at an early stage, one of the bursts is marked so poor that it is not worth processing further, which could be considered selection diversity. On the other hand, the received signals could also be buffered and combined in a suitable stage so that the quality of communication is enhanced. The combining can be performed, as is known, for instance, by summing the signals as cophased before detection or by combining the signals in the channel equalizer or in the error correcting circuit or in the source decoder (for instance, a speech decoder), etc. The selection can also be performed, as is known, in subsequent phases (before detection, after the equalizer, after the error correcting circuit, after the source decoder, etc.). Correspondingly, the selection or combining can also be performed in the base station side, whereby the selection or combining would, however, be carried out in the base station controller or the center.

Transmission of two bursts (to two base stations) naturally consumes more power than the conventional communication to one base station at a time but, on the other hand, it should be taken into account that a momentary peak power does not increase because there is a time difference between bursts. Consequently, the application of the method according to the invention requires no changes in the power amplifier of the transmitter of the mobile station. The generation of the burst can be performed once, after which it is sent in the TDMA system in two time slots so that the need for signal processing required by two transmissions is not necessarily doubled.

In the case of FIG. 5 the soft handover is performed so that two separate transmissions are used for the preparation and the switching only when transmitting from the base station towards MS. Thus MS only sends once and several base stations receive the same signal (macrodiversity). In this way the power consumption of the MS can be saved. However, this alternative method includes drawbacks such as the problems mentioned in the beginning related to macrodiversity.

The soft handover according to the invention functions especially well in a TDMA system with a high TDMA ratio. Thus the base station has more alternatives for selecting a time slot which suits well the mobile station in question so that the MS has enough time to change the frequency between bursts, for instance, if so required. In a GSM type of system in which a frame comprises eight time slots (8-TDMA), this method according to the invention can be used as well, as long as the synthetizers, for instance are fitted in a corresponding way so that the mobile station has time to change the frequency between bursts if so required.

The above-described method can also be used, according to the invention, in CDMA and FDMA systems. Thus two codes need to be used in the CDMA system and in the FDMA system, two channels.

According to a modification of the invention the mobile station is capable of being in signalling communication with both base stations, or via them to center MSC, for instance, if so required. Thus the signalling can be arranged in a more reliable way in difficult cases.

In accordance with the block diagram of FIG. 7 an aspect of this invention provides apparatus and methods for performing handover in a cellular radio system comprising a first cell (CELL 1) and a second cell (CELL 2) disposed adjacent to the first cell, wherein two different communication channels are utilized during handover between the first cell and the second cell.

The cellular radio system includes a first base station (BTS1) and a second base station (BTS2) for respective first and second cells and at least one mobile station (MS). The MS includes a transceiver embodied in a receiver (RCVR) and a transmitter (XMTR) which provide means for communicating between the second base station (BTS2) and the at least one mobile station (MS) via a second base station (BTS2) communication channel (CHANNEL 2). CHANNEL 2 is different from a communication channel (CHANNEL 1) utilized by the first base station (BTS1) for communicating with the at least one mobile station (MS) during a handover or handoff of the MS between the first base station (BTS1) and the second base station (BTS2).

The MS includes a MONITOR for monitoring signals transmitted to the mobile station (MS) from the first base station (BTS1) and the second base station (BTS2). The cellular radio system further includes a SELECTOR (SEL) for selecting the second base station (BTS2) communication channel for communicating between the at least one mobile station (MS) and the second base station (BTS2) when an output from the MONITOR fulfills a predetermined criterion.

The cellular radio telephone system further comprises at least one mobile switching center (MSC). In a first embodiment of the invention the SELECTOR is disposed at the MSC, and the output of the MONITOR is transferred from the MS, via CHANNEL 1 and/or CHANNEL 2 and the respective BTS1 and BTS2, to the SELECTOR at the MSC. Alternately, the SELECTOR is disposed at the first or second base station (BTS1, BTS2), as shown in dashed outline, or may disposed in the at least one mobile station (MS), also shown in dashed outline.

In view of the foregoing description it will be evident to a person skilled in the art that various modifications my be made within the scope of the invention.

The scope of the present disclosure includes any novel feature or combination of futures disclosed therein either explicitly or implicitly or any generalisation thereof irrespective of whether or not it relates to the chimed invention or mitigates any or all of the problems addressed by the present invention. The applicant hereby gives notice that new claims may be formulated to such features during prosecution of this application or of any such further application derived therefrom.

What we claim is:

1. A method for enhancing handover in a digital cellular radio telephone system based on time division multiple access (TDMA), the system having at least one mobile switching center (MSC), at least first and second base stations (BTS1, BTS2) each of which transmits and receives information during a frame comprised of sequentially occurring timeslots, and at least one mobile station (MS) which also transmits and receives information during a frame comprised of time slots, characterized by the steps of:

prior to performing a handover of the at least one mobile station (MS) from the first base station to the second base station, establishing parallel signal links between the mobile station (MS) and the at least first and second base stations (BTS1, BTS2) by using first time slots between the mobile station (MS) and the first base station (BTS1) and second, different time slots between the mobile station (MS) and the second base station (BTS2);

communicating the same user information over the established parallel signal links using the first and second time slots;

combining received user information in at least one of the mobile switching center (MSC) and the mobile station (MS); and severing the signal link with the first base station (BTS1) while continuing to communicate the user information with the second base station (BTS2) in the second time slots; wherein the step of communicating includes the steps of:

monitoring, at the mobile station (MS), a signal received at least over the signal link established with the second base station (BTS2); and communicating an indication of the monitored signal to the first base station (BTS1) over the signal link established with the first base station (BTS1).

2. In a cellular communications system, a method for performing a handover of a mobile station from a first base station to a second base station, comprising the steps of:

bidirectionally communicating information between the mobile station and the first base station using at least one first time slot in a first downlink communication channel and at least one second time slot in a first uplink communication channel;

establishing bidirectional communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating bidirectional communication between the mobile station and the first base station while maintaining the established bidirectional communication with the second base station, thereby handing over the mobile station from the first base station to the second base station; wherein the step of bidirectionally communicating information includes the steps of:

monitoring, at the mobile station, a signal received at least from the second downlink communication channel; and communicating an indication of the monitored signal to the first base station through the at least one second time slot in the first uplink communication channel; and wherein the step of communicating information further includes the steps of:

communicating information from the first base station to the mobile station through the at least one first time slot in the first downlink communication channel while also communicating the same information from the second base station to the mobile station through the at least one third time slot in the second downlink communication channel; and combining, in the mobile station, the information received through the at least one first time slot with the information received through the at least one third time slot.

3. A method as set forth in claim 2 and further including the steps of:

transferring the communicated indication of the monitored signal to a cellular communication control node from the first base station;

determining at the control node, based at least in part on the transferred indication of the monitored signal, a time to initiate a handover of the mobile station from the first base station to the second base station; and sending a first command from the control node to the mobile station via the first base station and the first downlink communication channel.

4. A method as set forth in claim 3 wherein the mobile station executes the step of establishing bidirectional communication between the mobile station and the second base station in response to receiving the command.

5. A method as set forth in claim 2 and further including the steps of:

determining at the first base station, based at least in part on the indication of the monitored signal, a time to initiate a handover of the mobile station from the first base station to the second base station; and sending a first command from the first base station to the mobile station via the first downlink communication channel; wherein the mobile station executes the step of establishing bidirectional communication between the mobile station and the second base station in response to receiving the command.

6. A method as set forth in claim 2 wherein the first downlink communication channel and the first uplink communication channel use different frequencies.

7. A method as set forth in claim 2 wherein the first downlink communication channel and the first uplink communication channel use the same frequencies.

8. A method as set forth in claim 2 wherein the first time slot and the second time slot occur within a single frame and are offset from one another by a predetermined period of time, and wherein the third time slot and the fourth time slot occur within the same frame.

9. A method as set forth in claim 2 and further comprising a step of combining the information received through the at least one second time slot with the information received through the at least one fourth time slot.

10. In a cellular communications system, a method for performing a handover of a mobile station from a first base station to a second base station, comprising the steps of:

bidirectionally communicating information between the mobile station and the first base station using at least one first time slot in a first downlink communication channel and at least one second time slot in a first uplink communication channel;

establishing bidirectional communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating bidirectional communication between the mobile station and the first base station while maintaining the established bidirectional communication with the second base station, thereby handing over the mobile station from the first base station to the second base station; wherein the step of bidirectionally communicating information includes the steps of:

monitoring, at the mobile station, a signal received at least from the second downlink communication channel; and communicating an indication of the monitored signal to the first base station through the at least one second time slot in the first uplink communication channel, the method further including the steps of:

transferring the communicated indication of the monitored signal to a cellular communication control node from the first base station;

determining at the control node, based at least in part on the transferred indication of the monitored signal, a time to initiate a handover of the mobile station from the first base station to the second base station; and sending a first command from the control node to the mobile station via the first base station and the first downlink communication channel;

wherein the mobile station executes the step of establishing bidirectional communication between the mobile station and the second base station in response to receiving the command; and wherein the step of communicating information includes the steps of:

continuing to monitor, at the mobile station, a signal received from at least the second downlink communication channel;

communicating an indication of the monitored signal to the first base station through the at least one second time slot in the first uplink communication channel and also to the second base station through the at least one fourth time slot in the second uplink communication channel;

transferring the communicated indication of the monitored signal to the cellular communication control node from at least one of the first base station and the second base station;

determining at the control node, based at least in part on the transferred indication of the monitored signal, a time to handover the mobile station from the first base station to the second base station;

sending a second command from the control node to the mobile station via at least one of the first base station and the second base station; and executing the step of terminating in response to the mobile station receiving the second command.

11. In a cellular communications system, a method for performing a handover of a mobile station from a first base station to a second base station, comprising the steps of:

bidirectionally communicating information between the mobile station and the first base station using at least one first time slot in a first downlink communication channel add at least one second time slot in a first uplink communication channel;

establishing bidirectional communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating bidirectional communication between the mobile station and the first base station while maintaining the established bidirectional communication with the second base station, thereby handing over the mobile station from the first base station to the second base station; wherein the step of bidirectionally communicating information includes the steps of:

monitoring, at the mobile station, a signal received at least from the second downlink communication channel; and communicating an indication of the monitored signal to the first base station through the at least one second time slot in the first uplink communication channel, the method further including the steps of:

determining at the first base station, based at least in part on the indication of the monitored signal, a time to initiate a handover of the mobile station from the first base station to the second base station; and sending a first command from the first base station to the mobile station via the first downlink communication channel; wherein the mobile station executes the step of establishing bidirectional communication between the mobile station and the second base station in response to receiving the command; wherein the step of communicating information includes the steps of:

continuing to monitor, at the mobile station, a signal received from at least the second downlink communication channel;

communicating an indication of the monitored signal to the first base station through the at least one second time slot in the first uplink communication channel and also to the second base station through the at least one fourth time slot in the second uplink communication channel;

determining at one of the first base station and the second base station, based at least in part on the indication of the monitored signal, a time to handover the mobile station from the first base station to the second base station;

sending a second command to the mobile station from at least one of the first base station and the second base station; and executing the step of terminating in response to the mobile station receiving the second command.

12. In a cellular communications system, a method for performing a handover of a mobile station from a first base station to a second base station, comprising the steps of:

bidirectionally communicating information between the mobile station and the first base station using at least one first time slot in a first downlink communication channel and at least one second time slot in a first uplink communication channel;

establishing bidirectional communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating bidirectional communication between the mobile station and the first base station while maintaining the established bidirectional communication with the second base station, thereby handing over the mobile station from the first base station to the second base station; wherein the step of bidirectionally communicating information includes the steps of:

monitoring, at the mobile station, a signal received at least from the second downlink communication channel;

determining at the mobile station, based at least in part on the monitored signal, a time to initiate a handover of the mobile station from the first base station to the second base station; and executing, at the determined time to initiate handover, the step of establishing bidirectional communication between the mobile station and the second base station; and wherein the step of communicating information further includes the steps of:

communicating information from the first base station to the mobile station through the at least one first time slot in the first downlink communication channel while also communicating the same information from the second base station to the mobile station through the at least one third time slot in the second downlink communication channel; and combining, in the mobile station, the information received through the at least one first time slot with the information received through the at least one third time slot.

13. A method as set forth in claim 12 wherein the step of communicating information includes the steps of:

continuing to monitor, at the mobile station, a signal received from at least the second downlink communication channel;

determining at the mobile station, based at least in part on the monitored signal, a time to handover the mobile station from the first base station to the second base station; and executing, at the determined time to handover, the step of terminating.

14. In a cellular communications system, a method for performing a handover of a mobile station from a first base station to a second base station, comprising the steps of:

bidirectionally communicating information between the mobile station and the first base station using at least one time slot in a first downlink communication channel and at least one second time slot in a first uplink communication channel;

establishing communication between the mobile station and the second base station using at least one third time slot in a second downlink communication channel;

communicating information from the mobile station to the first base station through the at least one second time slot in the first uplink communication channel while also simultaneously communicating the same information from the mobile station to the second base station through the at least one second time slot in the first uplink communication channel; and terminating bidirectional communication between the mobile station and the first base station while maintaining the established communication with the second base station using the at least one third time slot in the second downlink communication channel, thereby handing over the mobile station from the first base station to the second base station.

15. A cellular communications system, comprising:

a first base station serving a first communications cell;

a second base station serving a second communications cell; and a mobile station including transceiver means for bidirectionally communicating information between the mobile station and the first base station using at least one time slot in a first downlink communication channel and at least one second time slot in a first uplink communication channel, said transceiver means being controlled to also establish bidirectional communication between the mobile station and the second base station using at least one third time slot in a second downlink communication channel and at least one fourth time slot in a second uplink communication channel, said transceiver means being further controlled to communicate information from the mobile station to the first base station through the at least one second time slot in the first uplink communication channel while also communicating the same information from the mobile station to the second base station through the at least one fourth time slot in the second uplink communication channel, wherein said transceiver means is further controlled to terminate bidirectional communication between the mobile station and the first base station while maintaining the established bidirectional communication with the second base station, thereby handing over the mobile station from the first base station to the second base station; wherein the mobile station further comprises means for monitoring a signal received at least from the second downlink communication channel; and wherein said transceiver means is further controlled to communicate an indication of the monitored signal to the first base station through the at least one second time slot in the first uplink communication channel; wherein the system further comprises:

means for communicating voice information from the first base station to the mobile station through the at least one first time slot in the first downlink communication channel while also communicating the same voice information from the second base station to the mobile station through the at least one third time slot in the second downlink communication channel; and wherein the mobile station is further comprised of means for forming an audio signal from the voice information received through the at least one first time slot and also from the voice information received through the at least one third time slot.

16. A cellular communications system, comprising:

a first base station serving a first communications cell;

a second base station serving a second communications cell; and a mobile station including transceiver means for bidirectionally communicating information between the mobile station and the first base station using at least one time slot in a first downlink communication channel and at least one second time slot in a first uplink communication channel, said transceiver means being controlled to also establish bidirectional communication between the mobile station and the second base station using at least one third time slot in a second downlink communication channel and at least one fourth time slot in a second uplink communication channel, said transceiver means being further controlled to communicate information from the mobile station to the first base station through the at least one second time slot in the first uplink communication channel while also communicating the same information from the mobile station to the second base station through the at least one fourth time slot in the second uplink communication channel, wherein said transceiver means is further controlled to terminate bidirectional communication between the mobile station and the first base station while maintaining the established bidirectional communication with the second base station, thereby handing over the mobile station from the first base station to the second base station; wherein the mobile station is further comprised of:

means for monitoring a signal received at least from the second downlink communication channel; and wherein said transceiver means is controlled to communicate an indication of the monitored signal to at least one of the first base station through the at least one second time slot in the first uplink communication channel and the second base station through the at least one fourth time slot in the second uplink communication channel; wherein the system further comprises:

means for communicating voice information from the first base station to the mobile station through the at least one first time slot in the first downlink communication channel while also communicating the same voice information from the second base station to the mobile station through the at least one third time slot in the second downlink communication channel; and wherein the mobile station is further comprised of means for forming an audio signal from the voice information received through the at least one first time slot and also from the voice information received through the at least one third time slot.

17. A system as set forth in claim 16 and further comprising:

a cellular communication control node that is bidirectionally coupled to said first base station and to said second base station;

means for transferring the communicated indication of the monitored signal to said cellular communication control node from at least one of the first base station and the second base station;

means for determining, at the control node, based at least in part on the transferred indication of the monitored signal, a time to handover the mobile station from the first base station to the second base station; and means for sending a handover command from the control node to the mobile station.

18. A cellular Time Division Multiple Access (TDMA) communications system, comprising:

a first base station serving a first communications cell;

a second base station serving a second communications cell; and a mobile station that includes means for bidirectionally communicating with said first and second base stations, wherein a handover of said mobile station between base stations is accomplished in three phases, wherein in a first phase said mobile station bidirectionally communicates user information and also signalling information only with said first base station using at least one time slot in a first downlink communication channel and at least one time slot in a first uplink communication channel, wherein in a third phase said mobile station bidirectionally communicates said user information and also signalling information only with said second base station using at least one time slot in a second downlink communication channel and at least one time slot in a second uplink communication channel, and wherein in a second phase said mobile station bidirectionally communicates said user information and also signalling information with said first base station using said at least one time slot in said first downlink communication channel and said at least one time slot in said first uplink communication channel while also bidirectionally communicating said user information and also signalling information with said second base station using said at least one time slot in said second downlink communication channel and said at least one time slot in said second uplink communication channel; wherein the mobile station is further comprised of means for monitoring a signal received at least from the second downlink communication channel; and wherein said means for bidirectionally communicating is controlled to communicate an indication of the monitored signal to at least one of the first base station through the at least one time slot in the first uplink communication channel and the second base station through the at least one time slot in the second uplink communication channel; wherein the system further comprises:

means for communicating voice information from the first base station to the mobile station through the at least one first time slot in the first downlink communication channel while also communicating the same voice information from the second base station to the mobile station through the at least one third time slot in the second downlink communication channel; and wherein the mobile station is further comprised of means for forming an audio signal from the voice information received through the at least one first time slot and also from the voice information received through theist least one third time slot.

19. A cellular Time Division Multiple Access (TDMA) communications system, comprising:

a first base station serving a first communications cell;

a second base station serving a second communications cell; and a mobile station that includes means for bidirectionally communicating with said first and second base stations, wherein a handover of said mobile station between base stations is accomplished in three phases, wherein in a first phase said mobile station bidirectionally communicates user information and also signalling information only with said first base station using at least one time slot in a first downlink communication channel and at least one time slot in a first uplink communication channel, wherein in a third phase said mobile station bidirectionally communicates said user information and also signalling information only with said second base station using at least one time slot in a second downlink communication channel and at least one time slot in a second uplink communication channel, and wherein in a second phase said mobile station bidirectionally communicates said user information and also signalling information with said first base station using said at least one time slot in said first downlink communication channel and said at least one time slot in said first uplink communication channel while also bidirectionally communicating said user information and also signalling information with said second base station using said at least one time slot in said second downlink communication channel and said at least one time slot in said first uplink communication channel; wherein the mobile station is further comprised of means for monitoring a signal received at least from the second downlink communication channel; and wherein said means for bidirectionally communicating is controlled to communicate an indication of the monitored signal to at least one of the first base station through the at least one time slot in the first uplink communication channel and the second base station through the at least one time slot in the first uplink communication channel.

20. In a cellular communications system, a method for performing a handover of a mobile station from a first base station to a second base station, comprising the steps of:

communicating information between the mobile station and the first base station using at least one first time slot in a first downlink communication channel and at least one second time slot in a first uplink communication channel;

establishing communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating communication between the mobile station and the first base station while maintaining the established communication with the second base station, thereby handing over the mobile station from the first base station to the second base station; wherein the step of communicating information further includes the steps of:

communicating voice information from the first base station to the mobile station through the at least one first time slot in the first downlink communication channel while also communicating the same voice information from the second base station to the mobile station through the at least one third time slot in the second downlink communication channel; and in the mobile station, forming an audio signal from the voice information received through the at least one first time slot and also from the voice information received through the at least one third time slot.

21. In a cellular communications system, a method for performing a handover of a mobile station from a first base station to a second base station, comprising the steps of:

communicating information between the mobile station and the first base station using at least one first time slot in a first downlink communication channel and at least one second time slot in a first uplink communication channel;

establishing communication between the mobile station and the second base station using at least one third time slot in a second downlink communication channel and at least one fourth time slot in a second uplink communication channel;

communicating information from the mobile station to the first base station through the at least one second time slot in the first uplink communication channel while also communicating the same information from the mobile station to the second base station through the at least one fourth time slot in the second uplink communication channel; and terminating communication between the mobile station and the first base station while maintaining the established communication with the second base station, thereby handing over the mobile station from the first base station to the second base station; wherein the step of communicating information further includes the steps of:

communicating voice information from the mobile station to the first base station through the at least one second time slot in the first uplink communication channel while also communicating the same voice information from the mobile station to the second base station through the at least one fourth time slot in the second uplink communication channel; and combining the voice information received through the at least one second time slot with the voice information received through the at least one fourth time slot.

\* \* \* \* \*